United States Patent [19]
Zifferer

[11] Patent Number: 5,321,829
[45] Date of Patent: Jun. 14, 1994

[54] GRAPHICAL INTERFACES FOR MONITORING LADDER LOGIC PROGRAMS

[75] Inventor: Scott C. Zifferer, Mequon, Wis.

[73] Assignee: ICOM, Inc., West Allis, Wis.

[21] Appl. No.: 556,958

[22] Filed: Jul. 20, 1990

[51] Int. Cl.$^5$ ............................................. G06F 9/00
[52] U.S. Cl. .................................. 395/575; 395/159; 371/29.1; 364/147; 364/DIG. 1; 364/275.1
[58] Field of Search ........ 395/575, 600, 650, 191–192, 395/147, 159; 364/147, 188; 371/29.1

[56] References Cited
U.S. PATENT DOCUMENTS

| | | |
|---|---|---|
| 3,686,639 | 8/1972 | Fletcher et al. . |
| 3,813,649 | 5/1974 | Struger et al. . |
| 3,882,305 | 5/1975 | Johnstone . |
| 3,964,026 | 6/1976 | Wanauchi et al. . |
| 4,038,533 | 7/1977 | Dummermuth et al. . |
| 4,200,914 | 4/1980 | Kintner . |
| 4,227,247 | 10/1980 | Kintner . |
| 4,244,034 | 1/1981 | Cherba . |
| 4,247,901 | 1/1981 | Martin et al. . |
| 4,316,260 | 2/1982 | Hideshima . |
| 4,396,974 | 8/1983 | Imazeki et al. . |
| 4,415,965 | 11/1983 | Imazeki . |
| 4,445,169 | 4/1984 | Wakiti et al. . |
| 4,449,180 | 5/1984 | Ohshima et al. . |
| 4,486,830 | 12/1984 | Taylor, Jr. et al. . |
| 4,488,258 | 12/1984 | Struger et al. . |
| 4,513,379 | 4/1985 | Wilson et al. . |
| 4,533,997 | 8/1985 | Furgerson . |
| 4,635,183 | 1/1987 | Isobe et al. . |
| 4,644,478 | 2/1987 | Stephens et al. . |
| 4,661,899 | 4/1987 | Usuda . |
| 4,663,704 | 5/1987 | Jones et al. . |
| 4,703,414 | 10/1987 | Inoue et al. . |
| 4,718,025 | 1/1988 | Minor et al. . |
| 4,815,014 | 3/1989 | Lipner et al. . |
| 4,833,592 | 5/1989 | Yamanaka . |
| 4,843,538 | 6/1989 | Lane et al. . |
| 4,991,076 | 2/1991 | Zifferer et al. ...................... 364/147 |
| 5,127,099 | 6/1992 | Zifferer et al. ...................... 395/725 |

OTHER PUBLICATIONS

Allen-Bradley Company, Inc., "Programming and Operations Manual", Bulletin 1772, Mini PLC-2/05 Processor.
Icom, Inc., "PLC-2 Ladder Logistics User's Manual", Aug. 1987.
Icom, Inc., "PLC-5 Ladder Logistics User's Manual", Sep. 1987.
Taylor Industrial Software, "Product Bulletin #24", Apr. 1987.
Icom, Inc., "PLC-3 Ladder Logistics User's Manual", Sep. 1987.
Taylor Industrial Software, "Product Summary", Feb. 1988.
Taylor Industrial Software, "Product Bulletin #21", Apr. 1987.
PLC-5 Ladder Logistics User's Manual, Sep. 1987, Icom, Inc.
MMI Logistics User's Manual, May 1990, Icom, Inc.

Primary Examiner—Paul V. Kulik
Assistant Examiner—Jennifer M. Orzech
Attorney, Agent, or Firm—Merchant, Gould, Smith, Edell, Welter & Schmidt

[57] ABSTRACT

A menu-driven system for developing Man-Machine Interfaces (MMI) for use in the graphical monitoring of ladder logic programs executing in programmable logic controllers PLCs. The Man-Machine Interfaces graphically depict plant processes controlled by the PLC. Data from the PLC representing plant process events (flows, state changes, tank levels, etc.) are communicated to the Man-Machine Interfaces. A Development System provides a programmer's "tool box" for constructing the Man-Machine Interfaces. Ladder logic programs and databases associated therewith are imported and accessed by the Development System for use in the development of the Man-Machine Interfaces. A Runtime System provides an execution environment for the Man-Machine Interfaces. The Runtime System has the ability to access ladder logic programs during monitoring operations. A user can "hot-key" to the ladder logic program for trouble-shooting purposes.

12 Claims, 9 Drawing Sheets

GRAPHICAL INTERFACES FOR MONITORING LADDER LOGIC PROGRAMS

BACKGROUND OF THE INVENTION

1. Field of the Invention

This invention relates in general to monitoring systems for programmable logic controllers (PLCs), and in particular, to a system for developing Man-Machine Interfaces to graphical monitor ladder logic programs executing in PLCs.

2. Description of Related Art

PLCs perform many of the control functions for assembly line machines, machine tools, and other types of industrial equipment. For example, a part arriving at a workstation may contact and close a limit switch or other type of sensing device. As a result, an electrical circuit is completed or broken, and a signal is sent to a PLC indicating the change in condition. The PLC responds to the input as directed by a ladder logic program which, to a large degree, simulates the response of what used to be accomplished by older systems with a set of relays and other control devices. Ladder logic programs instruct the PLC how and when to react to the different signals it receives. The PLC, in turn, instructs the devices it controls in an appropriate manner as specified in the ladder logic program.

In the prior art, operators can communicate with PLCs from personal computers or other control devices to monitor the status of ladder logic programs, trouble-shoot ladder logic programs, force the status of I/O status bits ON or OFF to simulate events, and perform a number of other functions. However, prior art systems offer little else in the way of monitoring aids.

For example, in the prior art, an engineer must manually build a monitoring system separately from the development of the ladder logic program. Thus, the engineer constructs a database for the monitoring system, including PLC stations, element addresses, possibly including textual descriptions and other information such as scaling factors and mathematical functions to be performed. Further, keeping these separate entities (i.e., the monitoring systems, the databases, and the ladder logic programs) synchronized can be a logistical nightmare.

Furthermore, in the prior art, an engineer does not have access during monitoring to the ladder logic program. Thus, the engineer typically must exit the monitoring system and separately access the ladder logic program, or use a separate computer for accessing the ladder logic program.

SUMMARY OF THE INVENTION

To overcome the limitations in the prior art described above, and to overcome other limitations that will become apparent upon reading and understanding this specification, the present invention discloses a menu-driven system for developing Man-Machine Interfaces (MMI) to graphically monitor ladder logic programs executing in PLCs. The Man-Machine Interfaces graphically depict plant processes controlled by the PLC. Data from the PLC representing plant process events (flows, state changes, tank levels, etc.) are communicated to the Man-Machine Interfaces for display.

A Development System in the preferred embodiment provides a programmer's "tool box" for constructing the Man-Machine Interfaces. Ladder logic programs and databases associated therewith are imported and accessed by the Development System for use in the development of the Man-Machine Interfaces.

A Runtime System in the preferred embodiment provides an execution environment for the Man-Machine Interfaces. The Runtime System has the ability to access ladder logic programs during monitoring operations. A user can "hot-key" to the ladder logic program for trouble-shooting purposes.

BRIEF DESCRIPTION OF THE DRAWINGS

Referring now to the drawings in which like reference numbers represent like elements throughout the several views.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

The preferred embodiment provides PC-based menu-driven software for developing Man-Machine Interfaces (MMI) to graphically monitor ladder logic programs executing in PLCs. The Man-Machine Interfaces graphically depict plant processes controlled by one or more PLCs. Data from the PLCs, representing plant process events (flows, state changes, tank levels, etc.), are communicated to the Man-Machine Interfaces for display.

The preferred embodiment operates in a hardware environment of the type described in FIGS. 13-16, and the description thereof, found in the co-pending and commonly assigned patent application Ser. No. 07/373,826 filed Jun. 30, 1989 now U.S. Pat. No. 4,991,076, by Scott C. Zifferer et al., entitled "METHOD AND APPARATUS FOR CREATING CUSTOM DISPLAYS FOR MONITORING LADDER LOGIC PROGRAMS", which application is incorporated herein by reference.

Figure 1:
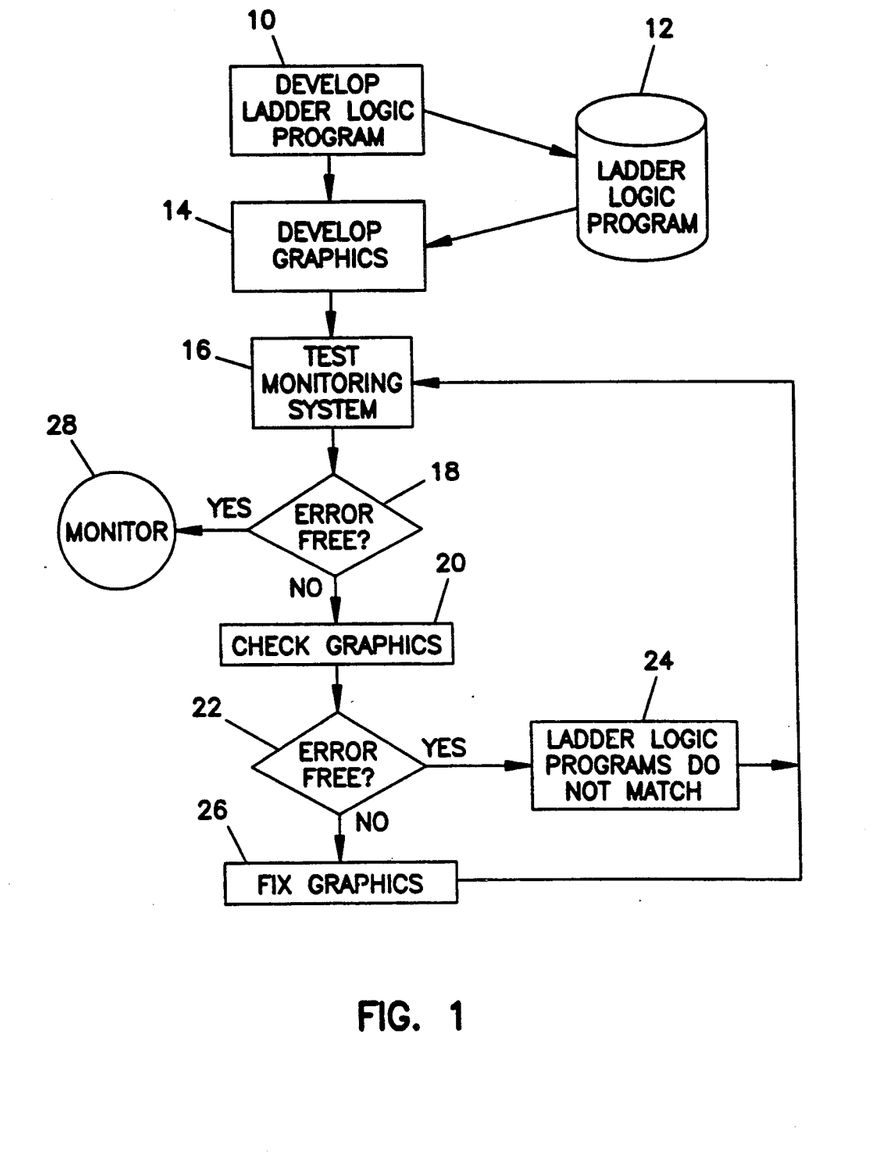
FIG. 1 is a flowchart illustrating a typical development and test cycle in the preferred embodiment.

FIG. 1 is a flowchart illustrating a typical development and test cycle in the preferred embodiment. The user develops a ladder logic program on a personal computer (10) and stores it in a disk file (12).

Typically, computer-based development systems are used to develop the ladder logic program. One example of a computer-based ladder logic development system is described in the "PLC-5 LADDER LOGISTICS ™ User's Manual", ICOM, Inc., which manual is incorporated herein by reference.

The user draws graphical objects representing the plant processes to be monitored (14), and "ties" or associates the graphical objects to elements in the ladder logic program (12). The user tests the monitoring system (16), and if errors are found (18), the graphical objects are reviewed for correctness (20). If no errors are found in the graphical objects (22), then the user checks that the ladder logic program is correct (24). Otherwise, the graphical objects are corrected if they are in error (26). Usually these steps are sufficient to resolve any errors. Once the errors are resolved, the user can begin monitoring the PLCs (28).

Thus, there are only a few steps in the development and debugging cycles of the preferred embodiment. Naturally, time savings turn into money savings for the user.

In addition to the description herein, more specific information on the Development System can be found in the "MMI Logistics ™—User's Manual", ICOM, Inc., which manual is incorporated herein by reference.

MMI Project

An important concept of the preferred embodiment is an "MMI Project". An MMI Project is the name given to an overall application. Although the MMI Project consists of many inherently unique entities, e.g., graphical objects, ladder logic programs, etc., all of these become integral parts of an application. The MMI Project serves as a superintendent for the application, allowing the user to define all the parts thereof and tie them together in a meaningful way for particular needs.

Development System

Figure 2:
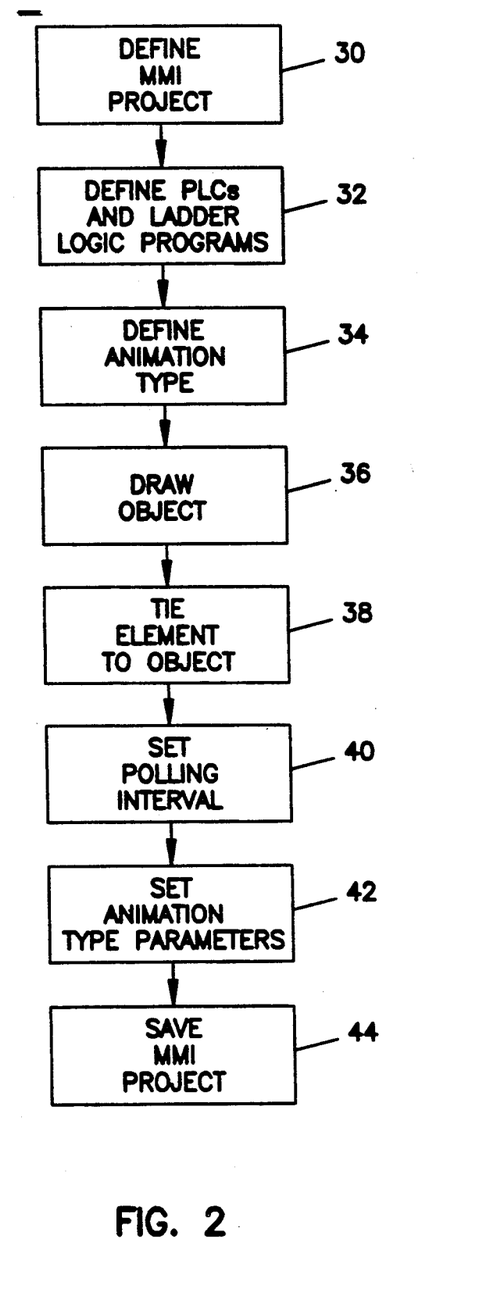
FIG. 2 is flowchart illustrating the steps performed by the Development System in constructing a Man-Machine Interface.

FIG. 2 is flowchart illustrating the steps performed by the Development System in constructing a Man-Machine Interface. The MMI Project is defined (30), along with its associated PLCs (i.e., station addresses on a network), ladder logic programs, and associated databases (32). The animation type is defined (34) and the corresponding graphical object is drawn (36). The graphical object is tied to an element of a ladder logic program (38). A polling interval is specified which indicates how often the element value is retrieved from the PLC (40). Also specified are specific "action" parameters for the graphical object that indicate how the object changes in response to changes in the element value (42). Finally, the MMI Project may be saved for later retrieval (44).

Figure 3:
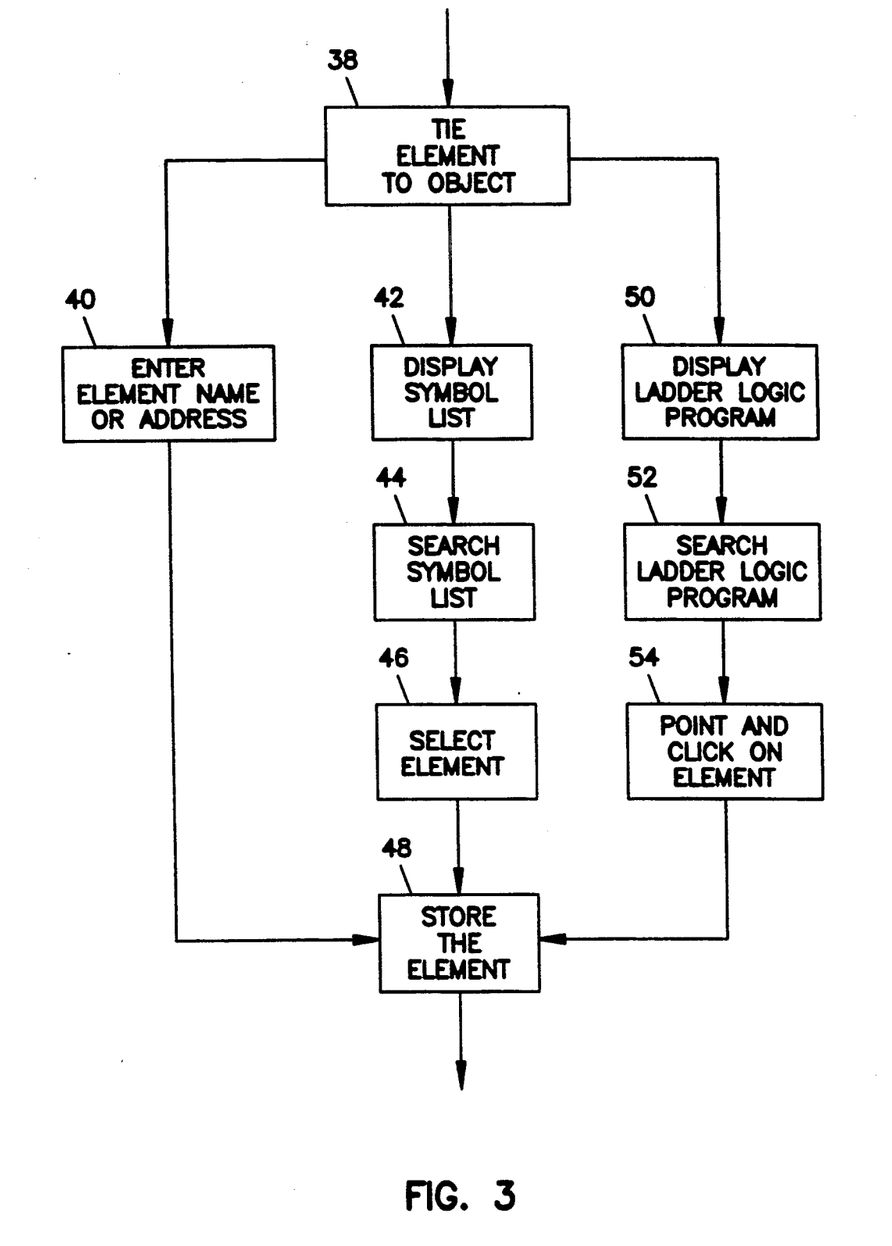
FIG. 3 describes three methods used by the Development System to tie elements to graphical objects.

FIG. 3 describes three methods used by the Development System to tie elements of ladder logic programs to graphical objects (38). The first method is the typing in of the PLC address associated with the element at an entry field displayed on the computer screen (40).

The second method is to press an input key designated as the SYMBOL key, thereby displaying a list of all symbols in the ladder logic program (42). The list may be searched for the desired element (44), and the desired element selected by positioning the cursor over it, and pressing the ENTER key (46). This sequence of steps eliminates most common typographical errors. This operation is further described in the co-pending and commonly assigned patent application Ser. No. 07/374,487 filed Jun. 30, 1989, now pending, by Scott C. Zifferer et al., entitled "METHOD AND APPARATUS FOR SYMBOLIC LADDER LOGIC PROGRAMMING WITH AUTOMATIC ATTACHMENT OF ADDRESSES", which application is incorporated herein by reference.

The third method is to press an input key designated as the LADDER LOGIC key to display the ladder logic program on the computer screen (50). The user can search through the ladder logic program for the desired element using any of the functions described in the co-pending and commonly assigned patent application Ser. No. 07/375,059 filed Jun. 30, 1989 now abandoned, by Scott C. Zifferer et al., entitled "METHOD AND APPARATUS FOR CROSS-REFERENCE SEARCHING IN LADDER LOGIC PROGRAMS", which application is incorporated herein by reference (52). The user also can search through the ladder logic program for the desired element using mouse input device as described in the "MMI Logistics ™—User's Manual", ICOM, Inc., which manual is incorporated herein by reference (52). Once the desired element is found, the user ties the object to the element via a "Point and Click" operation using a mouse input device (54).

In the "Point and Click" operation, the Development System recognizes which instruction and element of the ladder logic program are currently displayed under the cursor of the mouse input device. The element address is thus read from the ladder logic program. Because the "Point and Click" operation requires no keyboard input it eliminates most common typographical errors.

After the desired element has been selected by one of the three methods, it is stored in a data structure associating them with graphical objects (48).

Figure 4:
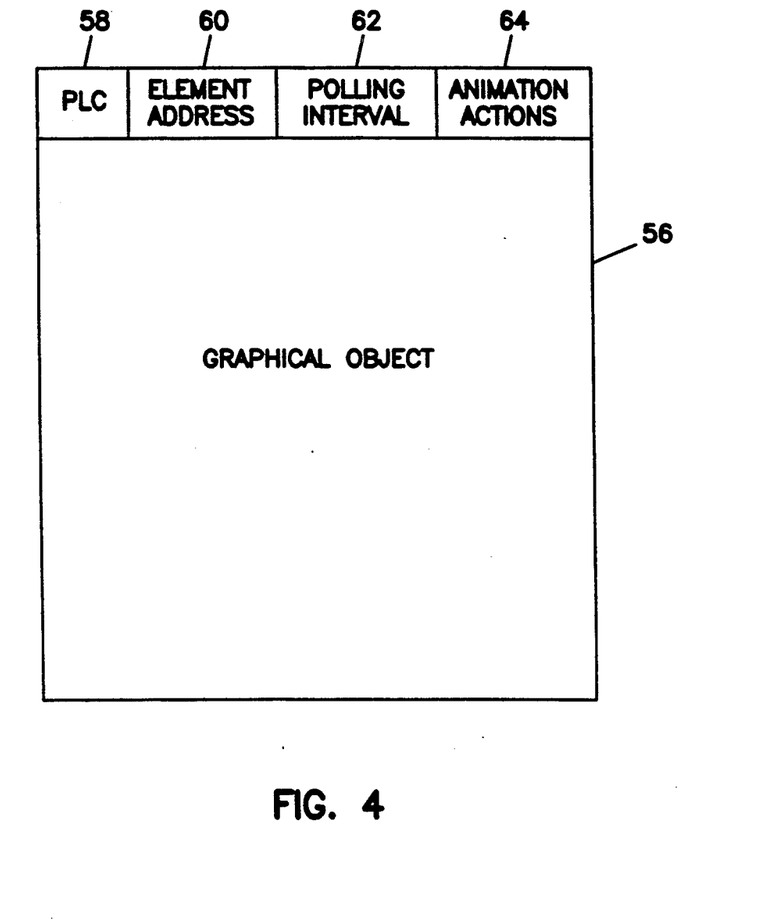
FIG. 4 describes a data structure for storing graphical objects, PLC addresses, element addresses, polling intervals, and action identifiers.

FIG. 4 describes a data structure for associating an element with a graphical object. The data structure stores a copy of the graphical object (56), a station address for the PLC being monitored (58), an address for the element in the PLC (60), a polling interval (62), and identifiers that describe what animation actions occur when the element value changes (64). Each MMI Project may have multiple screens for display on the computer. Each screen may have multiple objects thereon for display on the computer, each accessing different elements in the same or different PLCs.

Runtime System

Figure 5:
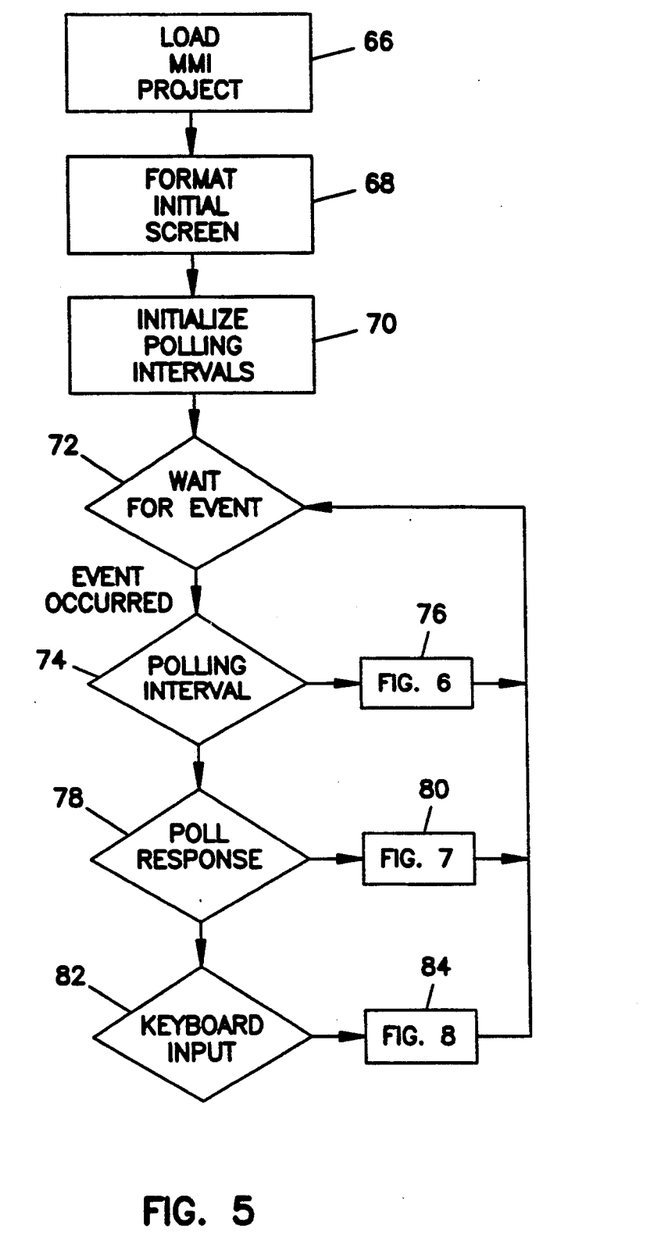
FIG. 5 is a flowchart illustrating the steps performed by the Runtime System in executing an MMI Project.

FIG. 5 is a flowchart illustrating the steps performed by the Runtime System in executing an MMI Project. The Runtime System provides an execution environment for the MMI Project. The Runtime System itself is executed by a computer which communicates with one or more PLCs.

Figure 7:
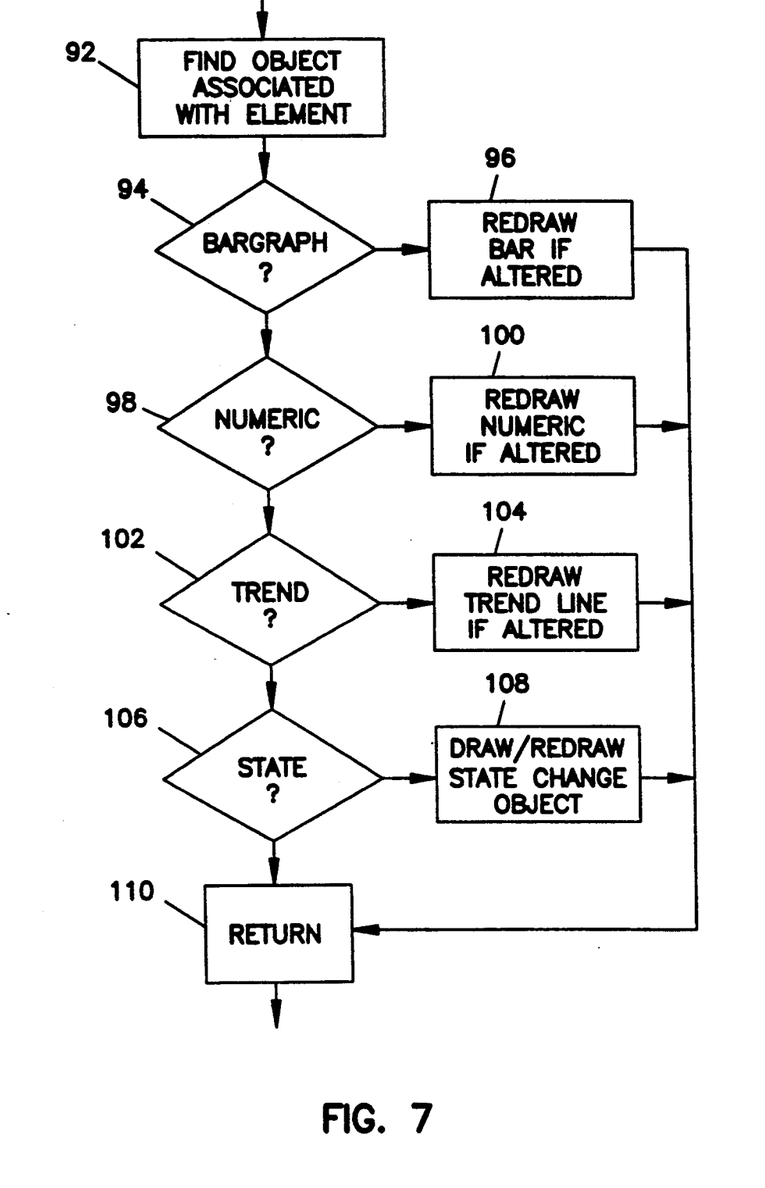
FIG. 7 is a flowchart illustrating the steps performed by the Runtime System when a response to a poll is received from the PLC.
Figure 8:
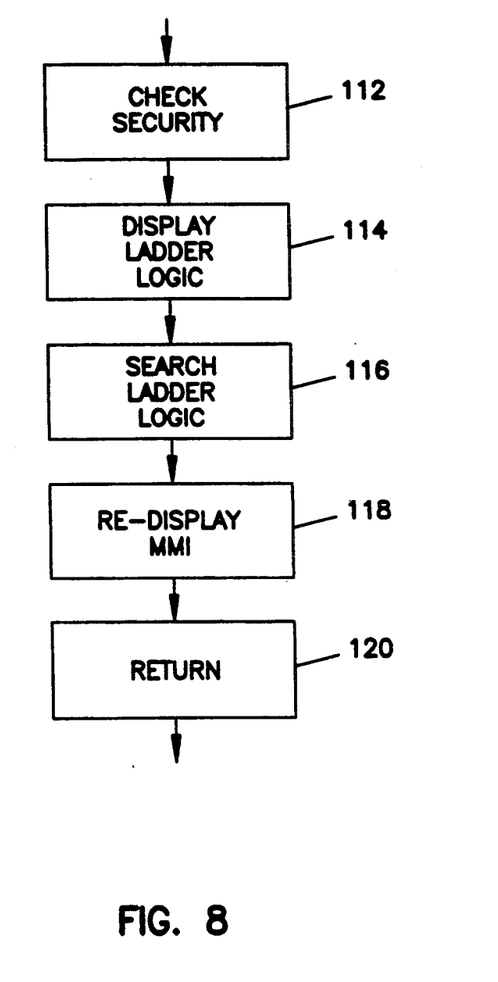
FIG. 8 is a flowchart illustrating the steps performed by the Runtime System when user input is received, either from a keyboard or other input device.

The MMI Project is loaded (66) and the initial screen of graphical objects is displayed (68). The Runtime System initializes polling intervals for each object contained in the MMI Project (70). A loop is entered, whereby the Runtime System waits for an event to occur (72). The Runtime System may handle a number of different events: the triggering of a polling interval (74-76); a response from the PLC (78-80); or the entry of commands by the operator from the computer (82-84). As indicated in FIG. 5, details regarding each of these events are illustrated in FIG. 6, 7, and 8.

Polling Interval

Figure 6:
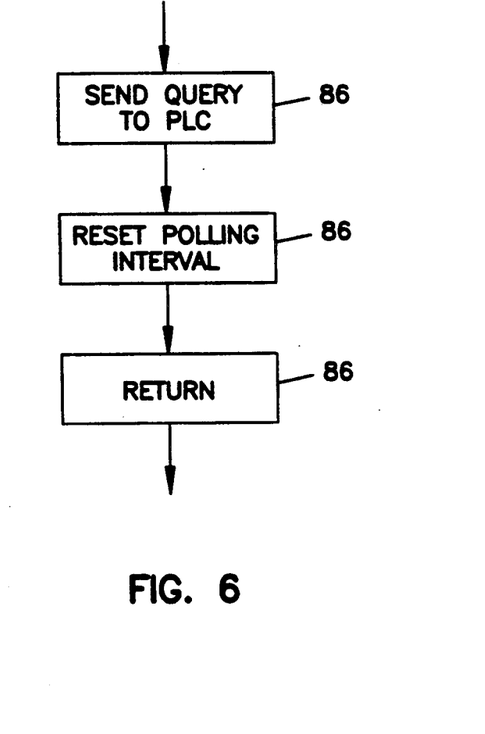
FIG. 6 is a flowchart illustrating the steps performed by the Runtime System when a polling interval is triggered.

FIG. 6 is a flowchart illustrating the steps performed by the Runtime System when a polling interval is triggered. A query message requesting a particular element value is generated by the Runtime System for transmission to the PLC (86). The Runtime System then resets the polling interval (88), and control returns to FIG. 5 (90).

Poll Response

FIG. 7 is a flowchart illustrating the steps performed by the Runtime System when a response to a poll is received from the PLC. The input is a message generated by the PLC in response to a prior query by the Runtime System, or an unsolicited message generated by the PLC in response to an "Exception Scan". The input typically comprises an element identifier and the current value therefor in the PLC. The Runtime System searches the data structures described in FIG. 4 to match the element to an object (92). In the next series of steps of FIG. 7, the Runtime System processes the input according to the type of object associated with the element: Bargraph objects (94-96); Numeric objects (98-100); Trend objects (102-104); and State Change objects (106-108). As indicated in FIG. 7, each graphical object is redrawn if the element value causes it to be altered. Note that the State Change object may be drawn for the first time. After the input has been processed, control returns to FIG. 5 (110).

Keyboard Event

FIG. 8 is a flowchart illustrating the steps performed by the Runtime System when operator input is received, either from a keyboard or other input device. Typically, such an input could indicate many things, including an exit from the Runtime System.

The Runtime System also has the ability to access ladder logic programs. The operator may "hot-key" to ladder logic programs for trouble-shooting, etc. Multiple "hot-keys" can be assigned to different MMI Projects, different ladder logic programs within the MMI Project, and different rungs within the ladder logic program.

Figure 9:
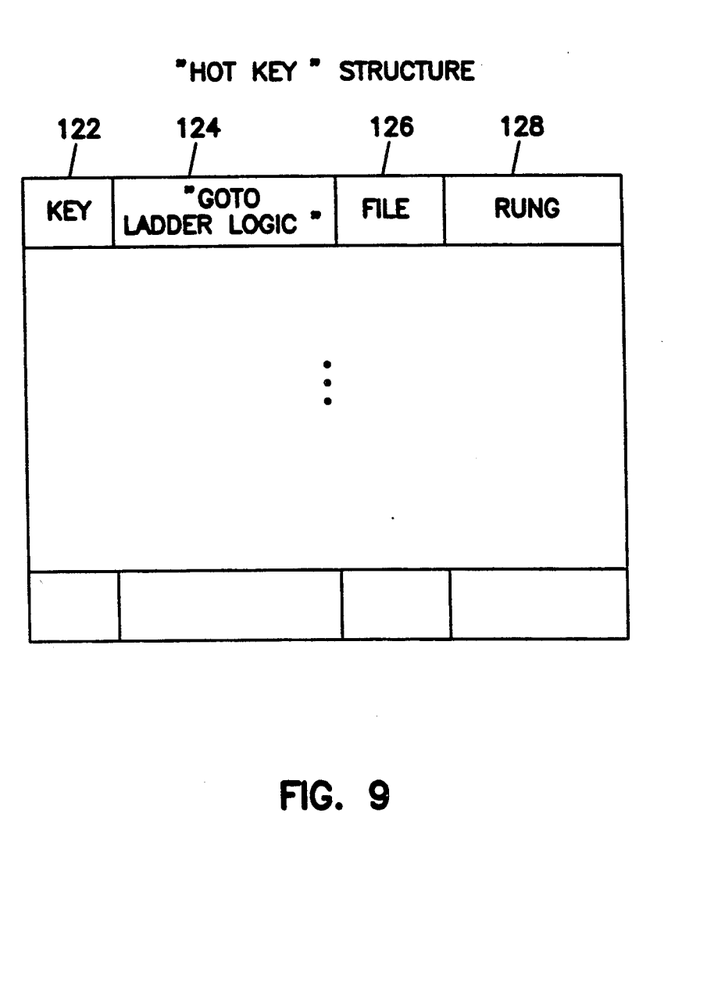
FIG. 9 describes the format of a "hot-key" data structure.

FIG. 9 describes the format of a "hot-key" data structure. This structure is usually created at the same time the MMI Project is constructed in the Development System. The first field 122 defines the keystrokes of the "hot-key." The second field 124 contains an identifier which indicates that upon accepting the input key, the Runtime System should display the ladder logic program. (Other actions, such as zooming the display of graphical objects, downloading element values to the PLC, or exiting the Runtime System could be specified as well). The third field 126 provides a filename where a copy of the associated ladder logic program is stored and a station address of the PLC executing the ladder logic program. The fourth field 128 identifies a specific rung, if any, within the ladder logic program. Thus, the operator can display a specific portion of a specific ladder logic program for troubleshooting purposes if the Man-Machine Interface indicates a problem.

FIG. 8 illustrates the steps performed by the Runtime System when the operator inputs a "hot-key" requesting access to the ladder logic program. The first step is to check security to prevent unauthorized access to the ladder logic system (112). This security system is an extension of the one described in the co-pending and commonly assigned patent application Ser. No. 07/375,270 filed Jun. 30, 1989 now U.S. Pat. No. 5,127,099, by Scott C. Zifferer et al., entitled "METHOD AND APPARATUS FOR SECURING ACCESS TO A LADDER LOGIC PROGRAMMING AND MONITORING SYSTEM", which application is incorporated herein by reference.

Once the security check is passed, the Runtime System accesses the "hot-key" data structure of FIG. 9 and extracts the filename and rung number therefrom to access and display the ladder logic program on the computer screen in place of the Man-Machine Interface (114). During the display of the ladder logic program, the operator has access to a number of search functions (116), including those described in the co-pending and commonly assigned patent application Ser. No. 07/375 059 filed Jun. 30 1989 now abandoned, by Scott C. Zifferer et al., entitled "METHOD AND APPARATUS FOR CROSS-REFERENCE SEARCHING IN LADDER LOGIC PROGRAMS", which application is incorporated herein by reference.

Once the operator has completed the search of the ladder logic program, the Runtime System re-displays the Man-Machine Interface and continues monitoring the PLCs (118). Control then returns to FIG. 5 (120).

Summary

In summary, a menu-driven system has been described, which system is used for developing Man-Machine Interfaces to graphical monitor ladder logic programs executing in PLCs. Man-Machine Interfaces graphically depict plant processes controlled by the PLC. Data from one or more PLCs representing plant process events (flows, state changes, tank levels, etc.) are then communicated to the Man-Machine Interface for display.

The Development System of the preferred embodiment provides a programmer's "tool box" for constructing the Man-Machine Interfaces. Ladder logic programs are imported and accessed by the Development System for use in the development of the Man-Machine Interfaces.

The Runtime System of the preferred embodiment provides the operational software that executes the Man-Machine Interfaces. The Runtime System has the ability to access ladder logic programs during monitoring operations. An operator can "hot-key" to the ladder logic program for trouble-shooting purposes.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-based method of monitoring a ladder logic program executing in a programmable logic controller, comprising the steps of:
    (a) drawing a graphical object on a monitor attached to a computer to depict a plant process controlled by the programmable logic controller, wherein the graphical object is selected from a group comprising Bargraph objects, Numeric objects, Trend objects, and State Change objects;
(b) electronically associating the graphical object to an element of the ladder logic program;
(c) setting a polling interval on the computer to indicate how often a value for the associated element is to be retrieved from the ladder logic program executing in the programmable logic controller;
(d) specifying action parameters on the computer to indicate changes in the display of the graphical object that are to occur in response to changes in the value of the associated element;
(e) responding to a triggering of the polling interval by transmitting a query message from the computer to the programmable logic controller requesting a value for the associated element and by resetting the polling interval; and
(f) responding to the value for the associated element being input from the programmable logic controller to the computer by changing the display of the graphical object in accordance with a change in the value of the associated element.

2. The method of claim 1, wherein the electronically associating step comprises the step of accepting an address entered by an operator at an entry field displayed on the monitor, the address identifying a memory location in the programmable logic controller associated with the element.

3. The method of claim 1, wherein the electronically associating step comprises the step of:
(1) accepting a designated key entered by an operator into the computer, and displaying a list of symbols used in the ladder logic program on the monitor in response thereto;
(2) searching the list for a symbol representing a specific element in the ladder logic program; and
(3) electronically associating the graphical object to the specific element.

4. The method of claim 1, wherein the electronically associating step comprises the steps of:
(1) accepting a designated key entered by the operator into the computer, and displaying the ladder logic program on the monitor in response thereto;
(2) searching through the ladder logic program for a specific element; and
(3) electronically associating the graphical object to the specific element.

5. A method of monitoring a ladder logic program executing in a programmable logic controller, comprising the steps of:
(a) displaying the graphical object on a monitor attached to the computer to depict a plant process controlled by the programmable logic controller, the graphical object being electronically associated with an element of the ladder logic program, wherein the graphical object is one selected from a group comprising Bargraph objects, Numeric objects, Trend objects, and State Change objects;
(b) initializing a polling interval on the computer for the graphical object, the polling interval indicating a waiting period before a value for the associated element is to be retrieved from the programmable logic controller;
(c) responding to a triggering of the polling interval by transmitting a query message from the computer to the programmable logic controller requesting a value for the associated element and by resetting the polling interval;
(d) responding to the value being input from the programmable logic controller to the computer by changing the display of the graphical object in accordance with a change in the value of the associated element; and
(e) responding to an entry of a hot-key command by an operator of the computer by accessing a "hot-key" data structure in the computer and extracting therefrom an electronically stored filename which identifies a location on the computer where a copy of the ladder logic program is stored, and displaying the copy of the ladder logic program on the monitor at a specific rung thereof.

6. The method of claim 5, further comprising the step of preventing unauthorized access to the copy of the ladder logic program.

7. A computer-based apparatus for monitoring a ladder logic program executing in a programmable logic controller, comprising:
(a) a computer, coupled to the programmable logic controller, having a monitor attached thereto, the computer further comprising:
(1) means for drawing a graphical object on the monitor to depict a plant process controlled by the programmable logic controller, wherein the graphical object is selected from a group comprising Bargraph objects, Numeric objects, Trend objects, and State Change objects;
(2) means for electronically associating the graphical object to an element of the ladder logic program;
(3) means for setting a polling interval on the computer to indicate how often a value for the associated element is to be retrieved from the ladder logic program executing in the programmable logic controller;
(4) means for specifying action parameters on the computer to indicate changes in the display of the graphical object that are to occur in response to changes in the value of the associated element;
(5) means for responding to a triggering of the polling interval by transmitting a query message from the computer to the programmable logic controller requesting a value for the associated element and by resetting the polling interval; and
(6) means for responding to the value for the associated element being input from the programmable logic controller to the computer by changing the display of the graphical object in accordance with a change in the value of the associated element.

8. The apparatus of claim 7, wherein the means for electronically associating comprises means for accepting an address entered by an operator at an entry field displayed on the monitor, the address identifying a memory location in the programmable logic controller associated with the element.

9. The apparatus of claim 7, wherein the means for electronically associating comprises:
(i) means for accepting a designated key entered by an operator into the computer, and displaying a list of symbols used in the ladder logic program on the monitor in response thereto;
(ii) means for searching the list for a symbol representing a specific element in the ladder logic program; and
(iii) means for electronically associating the graphical object to the specific element.

10. The apparatus of claim 7, wherein the means for electronically associating comprises:
 (i) means for accepting a designated key entered by the operator into the computer, and displaying the ladder logic program on the monitor in response thereto;
 (ii) means for searching through the ladder logic program for a specific element; and
 (iii) means for electronically associating the graphical object to the specific element.

11. An apparatus for monitoring a ladder logic program executing in a programmable logic controller, comprising:
 (a) a computer, coupled to the programmable logic controller, having a monitor attached thereto, the computer further comprising:
  (1) means for displaying a graphical object on the monitor to depict a plant process controlled by the programmable logic controller, the graphical object being electronically associated with an element of the ladder logic program, wherein the graphical object is selected from a group comprising Bargraph objects, Numeric objects, Trend objects, and State Change objects;
  (2) means for initializing a polling interval on the computer for the graphical object, the polling interval indicating a waiting period before a value for the associated element is to be retrieved from the programmable logic controller;
  (3) means for responding to a triggering of the polling interval by transmitting a query message from the computer to the programmable logic controller requesting a value for the associated element and by resetting the polling interval;
  (4) means for responding to the value being input from the programmable logic controller to the computer by changing the display of the graphical object in accordance with a change in the value for the associated element; and
  (5) means for responding to an entry of a hot-key command by an operator of the computer by accessing a "hot-key" data structure in the computer and extracting therefrom an electronically stored filename which identifies a location on the computer where a copy of the ladder logic program is stored, and displaying the copy of the ladder logic program on the monitor at a specific rung thereof.

12. The apparatus of claim 11, wherein the computer further comprises means for preventing unauthorized access to the copy of the ladder logic program.

* * * * *